US009979866B2

(12) United States Patent
Buss

(10) Patent No.: US 9,979,866 B2
(45) Date of Patent: May 22, 2018

(54) CAMERA DEVICE FOR TRIGGERING A VEHICLE SPECIFIC FUNCTION

(71) Applicant: Huf Hülsbeck & Fürst GmbH & Co. KG, Velbert (DE)

(72) Inventor: Wolfgang Buss, Solingen (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 0 days. days.

(21) Appl. No.: 15/123,413

(22) PCT Filed: Feb. 11, 2015

(86) PCT No.: PCT/DE2015/100057
§ 371 (c)(1),
(2) Date: Sep. 2, 2016

(87) PCT Pub. No.: WO2015/120842
PCT Pub. Date: Aug. 20, 2015

(65) Prior Publication Data
US 2017/0064161 A1 Mar. 2, 2017

(30) Foreign Application Priority Data
Feb. 11, 2014 (DE) .................. 10 2014 101 689

(51) Int. Cl.
*H04N 5/225* (2006.01)
*B60R 11/04* (2006.01)
(Continued)

(52) U.S. Cl.
CPC ........... *H04N 5/2252* (2013.01); *B60R 11/04* (2013.01); *H04N 5/2253* (2013.01);
(Continued)

(58) Field of Classification Search
CPC .............................. H04N 5/2252; B60R 11/04
(Continued)

(56) References Cited

U.S. PATENT DOCUMENTS

2009/0309971 A1* 12/2009 Schuetz .................. B60R 11/04
348/148

FOREIGN PATENT DOCUMENTS

DE   102006039192 A1   2/2008
DE   102008010966 A1   8/2009
(Continued)

OTHER PUBLICATIONS

International Searching Authority, International Search Report and Written Opinion for PCT Application No. PCT/DE2015/100057, dated May 26, 2016.

*Primary Examiner* — Usman Khan
(74) *Attorney, Agent, or Firm* — Honigman Miller Schwartz and Cohn LLP; Jonathan P. O'Brien; Matthew H. Szalach

(57) ABSTRACT

A camera device (10) is provided and includes a drive unit (50) connected via a transmission mechanism to a carriage (11). The carriage (11) mechanically holds a camera (4) and can move the carriage (11) together with the camera (4) at least between a standby position (1) and a recording position (2) along a movement direction (7). The carriage (11) is movably arranged in a housing (20) by at least one guide (11.3, 11.4). A movable cover (12) can close an opening (23) in the housing (20) in a closed position when the camera (4) assumes its standby position (1). A switch element (16) can trigger a signal for a vehicle-specific function. In the closed position (17), a manual pressure (90) on the cover (12) causes movement of the carriage (11) with the camera (4), which can switch the camera from its standby position (1) into an auxiliary position (3).

24 Claims, 14 Drawing Sheets

Figure 1:
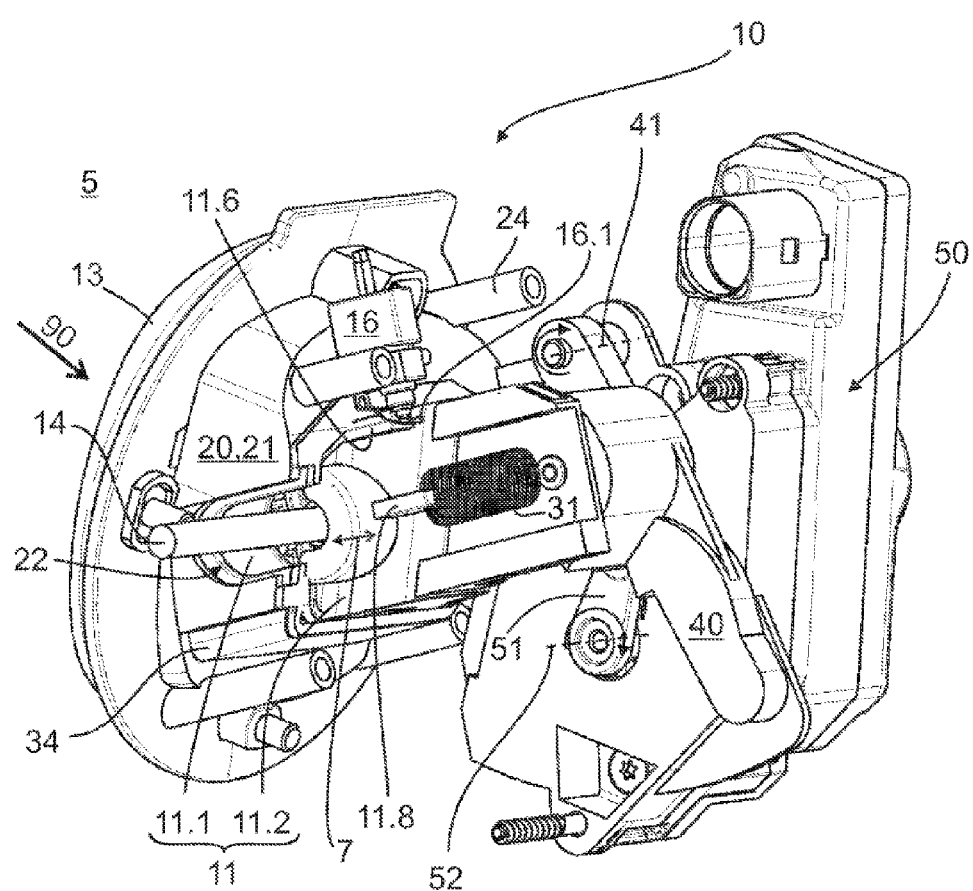

(51) Int. Cl.
    *H04N 5/232*     (2006.01)
    *H04N 7/18*     (2006.01)
    *B60R 11/00*     (2006.01)

(52) U.S. Cl.
    CPC ....... *H04N 5/2254* (2013.01); *H04N 5/23245* (2013.01); *H04N 5/23296* (2013.01); *H04N 7/183* (2013.01); *B60R 2011/0082* (2013.01); *B60R 2011/0084* (2013.01); *B60R 2011/0092* (2013.01)

(58) Field of Classification Search
    USPC .......................................................... 348/374
    See application file for complete search history.

(56) References Cited

FOREIGN PATENT DOCUMENTS

| | | |
|---|---|---|
| EP | 2076408 A2 | 7/2009 |
| WO | WO-2008043713 A2 | 4/2008 |

\* cited by examiner

CAMERA DEVICE FOR TRIGGERING A VEHICLE SPECIFIC FUNCTION

CROSS-REFERENCE TO RELATED APPLICATIONS

This application claims priority under 35 U.S.C. § 371 to Patent Cooperation Treaty Application No. PCT/DE2015/100057, filed Feb. 11, 2015, which claims priority to DE Application No. 102014101689.0, filed Feb. 11, 2014, the entire contents of which are incorporated herein by reference.

The present invention relates to a camera device, in particular for the rear region of a vehicle according to the preamble to claim 1. In camera devices of this kind, a drive unit is provided, which is operatively connected via a transmission mechanism to a carriage and the carriage mechanically fixes the position of the camera. In addition, the drive unit can move the carriage together with the camera at least between a standby position and a recording position along a movement direction. The camera device also has a housing in which the carriage is arranged in at least partially movable fashion by means of at least one guide, and a movable cover, which can close an opening in the housing for the camera in a closed position of the cover when the camera assumes its standby position. In addition, the camera device is provided with a switch element that can trigger a signal for a vehicle-specific function.

For example, German patent disclosure DE 10 2009 008,283 A1 is known from the prior art, which likewise mentions a camera device; however, therein, the camera is rigidly mounted on the camera device. To protect a lens of the camera, a movable cover element is provided, which can be moved back and forth between a closed position and an open position. In the closed position, the cover element protects at least the lens of the camera from environmental influences. In addition, the camera device is also provided with an actuation unit in order to be able to trigger a vehicle function such as the opening of a rear hatch of the vehicle. As is clear from the above-mentioned publication, the disclosed camera device requires a considerable amount of installation space in order to be accommodated in the vehicle. In particular, the corresponding camera device requires a significant amount of overall depth (installation depth) and installation width in order to be able to accommodate the drive mechanism for the movable cover element and the corresponding camera and the actuation unit.

Camera devices that contain the camera in a movable fashion are also known from the prior art. In camera devices of this kind, however, for example as disclosed by German patent disclosure DE 10 2009 015,610 A1, the pivoting mechanism provided for the camera entails an additional space requirement so that devices of this kind likewise have a significant overall size with a corresponding installation depth. The camera device disclosed in the above-mentioned publication, however, is not equipped with an additional actuation unit in order to be able to trigger a vehicle function such as the opening of a rear hatch of the vehicle.

The object of the present invention, therefore, is to produce a camera device that overcomes at least some of the above-mentioned disadvantages from the prior art. In particular, the object of the present invention is to produce a camera device that has a small installation width and installation depth and advantageously has a compact overall design. Another object of the present invention is to produce a particularly functional camera device, which is not only able to transmit image data to information systems in the vehicle, but also includes additional functionalities. Another object of the invention in particular is to produce such a camera device with a small number of components.

The present object is attained by means of a camera device, in particular for the rear region of a vehicle, with the features of claim 1, in particular from the characterizing part thereof. The dependent claims disclose preferred modifications of the invention, the particular meanings of which will be explained in greater detail below.

The camera device in question is equipped with a drive unit, which is operatively connected via a transmission mechanism to a carriage and the carriage mechanically accommodates a camera. Camera devices of this kind can be used particularly in vehicles, especially in the rear region thereof. Consequently, the present invention is also directed at a motor vehicle camera device. In addition, the drive unit can move the carriage in the camera device together with the camera at least between a standby position and a recording position along a movement direction. In the standby position, the camera is generally retracted into the camera device and is accommodated in a protected fashion therein, with the camera not recording image data. In the recording position, however, the camera protrudes at least partially out of an opening in the camera device in order to record image data and to transmit them, in particular to information systems in the vehicle. The camera can advantageously be connected to a camera cable in order to be able to transmit current image data. The camera device also has a housing in which the carriage is arranged in at least partially movable fashion by means of at least one guide. In addition, and a movable cover is provided, which can close an opening in the housing for the camera in a closed position of the cover when the camera assumes its standby position. The corresponding opening in the housing is provided for the camera when it assumes its recording position and thus protrudes at least part-way through the opening in the housing or performs the image recording. In addition, the camera device is provided with at least one switch element that can trigger a signal for a vehicle-specific function. This vehicle-specific function can in particular be triggered manually by a user from outside the vehicle. This can, for example, be an opening signal for the rear hatch of a vehicle or a wake-up function of the vehicle. According to the invention, in the camera device, in the closed position of the cover, a manual pressure exerted on the cover (particularly from the outside) causes a movement of the carriage with the camera. This pressure on the cover moves the carriage with the camera from its standby position into an auxiliary position and in so doing, actuates the switch element in order to trigger the signal for a vehicle-specific function. Thus, in the camera device according to the invention, it is not necessary to provide an additional actuating element for triggering the vehicle-specific function since the cover has an integrated actuating element in order to be able to trigger the vehicle-specific function. This makes it possible to also significantly reduce the installation width of the camera device with a movable camera according to the invention. Since the camera in the camera device according to the invention is not is not rigidly mounted, but can be moved between the standby position and the recording position, it has the advantage that the camera can optimally record the optical image recording area in its recording position. This is very advantageous particularly in situations that are challenging for image recording, for example when it is necessary to optically detect small objects behind the vehicle such as high curb edges or low bollards. The reduced number of components also makes it possible on the whole to achieve a particularly durable construction of the camera device according to the invention.

In the context of the invention, it is also conceivable for the switch element to be positioned on the housing and for it to protrude at least part-way into the travel path of the carriage. In this case, the carriage has a triggering element, which, particularly when the carriage with the camera is moved toward an auxiliary position, trips the switch element. Consequently, the carriage with the integrated camera acts directly on the switch element so that it is possible to dispense with a manual actuating element for the switch element. In addition, this allows the switch element to be positioned far from the opening of the housing, thus reliably ensuring a protection of the switch element from outside environmental influences.

It is also conceivable according to the invention for the switch element to be embodied in the form of a pushbutton that in particular has a switching lug as an actuating means, which can be actuated by the triggering element in the triggering process. A switch element of this kind produces a signal as soon as the switching lug is mechanically moved by the triggering element on the carriage. Consequently, even just a short triggering path of the carriage with the camera can be reliably detected by the switch element through measurement techniques. As a result, the travel path of the carriage between the standby position and the auxiliary position can be restricted to a few millimeters and while still being able to produce a reliable switching signal at the switch element. Ideally, the triggering path between the standby position and auxiliary position is <8 mm, in particular <5 mm, and especially <3 mm. In addition, the switch element embodied as a pushbutton provides the user with visual feedback since the switching point of the pushbutton is visible. At the same time, it is conceivable for the triggering process to be embodied in the form of a clicking that is audible to the user of the camera device.

It is also possible in the invention for the switch element to be fastened to the outside of the housing and for the actuating means to protrude into an interior of the housing in order to cooperate with the triggering element on the carriage in the triggering process. The switch element can thus be mounted on the camera device in a particularly protected way, for example inside a vehicle body, rear hatch, door, or the like, with only the actuating means protruding from the switch element into the possibly critical interior of the housing. This interior of the housing can become soiled when a cover is open since in an open position of the cover, the opening is not completely closed by the camera in its extended position. For this reason, it is also envisaged to mount the camera on or in the carriage in an enclosed fashion, which will be discussed in greater detail below. It is also conceivable for the opening of the housing for the camera to be closed by an additional seal that seals the gap between the carriage or camera and the opening edge of the housing in the extended position of the camera.

It is also possible in the camera device according to the invention for the housing to be stationary and for the carriage for the camera to be able to move back and forth therein between its recording position, standby position and auxiliary position.

With the invention, it is also conceivable for the carriage that serves to accommodate the camera to be composed of at least two parts, in particular with a first and second carriage part. The carriage can, in particular, constitute a casing or sheath for the camera in order to accommodate it in the carriage in a way that protects it from environmental influences. For this purpose, the casing has at least two openings for the camera, namely a lens opening for the lenses of the camera and a cable opening for the camera cable that must be routed out of the casing and carriage. In order to be able to mount the camera in the carriage in a particularly simple way, at least two carriage parts are provided, which can be physically separated from each other to install the camera.

It is also possible according to the invention to position sealing elements between the camera and the carriage, as a result of which the camera is enclosed in a particularly water-tight fashion. In this case, a sealing element can be placed around the lens of the camera and/or another sealing element can be placed around the camera cable. Ideally, the above-mentioned sealing elements are lightly pressed against the carriage in order to maintain the desired seal and the desired protection from environmental influences.

It is also conceivable according to the invention for the camera to be mounted to the carriage by means of at least one holding means. Preferably, at least two holding means can be provided in order to affix the camera to the first carriage part, particularly to the inside of it. At the same time, the first carriage part has the above-mentioned lens opening for the camera. It is also conceivable to provide a mechanical socket for the camera on the inside of the carriage part, which is essentially geometrically complementary to the camera housing, particularly in the lens region. By means of this mechanical socket, it is possible to ensure a proper positioning of the camera inside the carriage so that an incorrect mounting can be ruled out. The mechanical socket, which is particularly provided on the inside of the first carriage part in the vicinity of the opening for the camera lens, also makes it easier to mount the camera on the carriage. In order to finally hold the camera securely on or in the carriage, the above-mentioned holding means are provided. These can be interlocking connections and/or clip connections that produce a form-fitting connection to the camera housing. It is also conceivable for the holding means to be embodied in the form of screws in order to fasten the camera to the carriage in a particularly reliable fashion in a form-fitting and also frictional, non-positive way. By means of this, it is also possible to produce the necessary pressure for the sealing element(s) between the camera and the carriage. Advantageously, at least two holding means are used in order to be able to exert a uniform pressure from the camera to the sealing element in the region of the lens. For this purpose, at least two openings can be provided on the camera or camera housing, which mechanically cooperate with the holding means. If the holding means are screws or rivets, they can be inserted through the openings in the camera to the carriage part. Holding means in the form of screws can be screwed directly to the carriage part. Holding means in the form of rivets can be fastened in an integrally joined fashion at one end directly to the carriage part and protrude through the openings of the camera at the other end, at which the rivets are flanged. With plastic rivets, the flanging of the rivets can be achieved by means of a brief heat treatment with simultaneously applied pressure. Ideally, the two holding means are positioned at different heights. The different heights are understood to mean a different distance of the respective holding means from an imaginary horizontal plane of the camera. It is thus possible, on the one hand, to reliably avoid an incorrect mounting of the camera since there is only one installation position for the camera on the carriage in which the holding means effectively hold the camera. On the other hand, an increased tilting stability of the camera on the carriage can be achieved, thus achieving a particularly secure arrangement.

In order to further improve the mounting of the camera device according to the invention, it is possible for the carriage parts to be connected to each other with connecting means, in particular interlocking connections. Consequently, after the camera has been mounted, it is only necessary, more or less, to press the two carriage parts against each other, causing the interlocking connections to connect the two carriage parts to each other in a form-fitting way. Instead of the above-mentioned interlocking connection as a connecting means, it is naturally also possible to provide screw connections, which make it particularly easy to open the carriage for maintenance work on the camera. In order for the carriage parts that are connected to form the carriage to be particularly protected from mechanical stresses, in particular two or more connecting pieces can be provided, preferably above and below the camera port. This makes it possible for the carriage parts to clamp the sealing element, which protects the camera cable, and to exert an appropriate pressure and thus produce a seal.

In the context of the invention, it is also conceivable for the connected carriage parts to form a closed cutting line so that except for the cable opening for the camera cable, the carriage parts rest against each other, touching at the cutting line. The cutting line advantageously extends in the region of the cable opening in order to open it so as to permit the camera with the camera cable to be easily installed. Otherwise, it would be necessary to thread the camera cable through the closed cable opening in order to then connect it to the camera. This would make the camera much more difficult to install. It is therefore particularly advantageous to allow the cutting line to extend through the opening for the camera cable. It is also conceivable for the cutting line to be stepped or provided with shoulders in order to form a labyrinth seal between the carriage parts resting against each other. To further facilitate installation of the camera, it is advantageous if the existing cutting line does not lie in a uniform cutting plane, thus avoiding uniform can-like recesses with a homogeneous edge. It is possible to significantly improve the installation, particularly by lowering the cutting line in the vicinity of the holding means for the camera. Naturally, the carriage parts to be connected can be geometrically adapted to each other by means of their contour.

With the camera device according to the invention, it is optionally conceivable for the camera cable to be connected to the camera by means of a plug, in particular with an interlocking connection or clip connection. It is thus possible to first mount the camera to the one carriage part by means of the preferably provided holding means and then to plug the camera cable into the laterally situated camera port. In order to embody this connection in the simplest and most electromechanically secure fashion possible, an additional interlocking connection or clip connection can be provided. It is thus possible for the plug connector of the camera cable to be connected to the camera port in a form-fitting and/or frictional, non-positive manner. This also ensures that mechanical stresses do not cause a loosening of the plug connection. In addition, the interlocking or clip connection can automatically lock when the plug is slid onto the lateral cable port.

With the invention, it is also possible for the camera cable to be routed through a sleeve and through the cable opening in the carriage to the camera. This sleeve can be simultaneously equipped to be a kink-prevention sleeve, a sealing sleeve, and/or a tension-relief element. The camera cable can thus be sealed and mechanically fixed to the carriage by means of the cable opening. In addition, it is possible to prevent the cable from breaking in the region of the opening of the carriage. It has turned out to be particularly advantageous for the sleeve to be integrally joined to the camera cable. It is also conceivable for the sleeve to be embodied of one piece with the plug of the camera cable. The cable plug with the sleeve can thus be an integral component of the camera cable.

According to the invention, in the camera device, it is possible for the carriage to be arranged in movable fashion in the housing by means of at least one guide. This housing serves to accommodate and support the carriage with the camera and parts of the transmission that are actuated by the drive unit. The drive unit itself can likewise be positioned in the housing or positioned laterally next to this housing. The housing itself can be situated in stationary fashion relative to the camera device, with the carriage being provided in movable fashion inside the housing. In order to be able to move the camera in the camera device back and forth between the standby position and the recording position with as little resistance as possible, one or more guides is/are provided. Preferably, at least two guides are provided in the housing in order to thus prevent the carriage from jamming as it moves. The above-mentioned guide can advantageously be embodied as a closed guide so that in the predetermined guide, the carriage is only able to move back and forth between the standby position and the recording position. The movement direction of the carriage with the camera can also be embodied as exclusively linear. Consequently, the corresponding guides between the carriage and the camera housing can likewise be embodied as linear guides. Usually, simple kinematics can be employed in the use of the linear guide so that the corresponding camera device can be particularly simple and compact in design.

According to the invention, it is also conceivable for the carriage to be supported in moving fashion on the housing by means of two guides. In this case, the existing guides can be positioned in the lower region, in particular, each positioned laterally on the carriage. The carriage thus moves on the two guides on the left and right sides of the housing, back and forth between the standby position and the recording position. Ideally, the two guides are spaced apart from each other, in particular across the width of the carriage, in order to prevent the moving carriage from tilting in the housing. The two above-mentioned guides can in particular only be situated on the first carriage part, in fact in the outer, lower region thereof. The lower region is understood to be a region that is situated below the camera lens. The carriage advantageously rests more or less on the two guides of the housing and slides along on them. In this case, it is conceivable for the two guides on the carriage to have strut-shaped guide means that are preferably provided with slide cushions. In order to avoid possibly generating noise due to the back-and-forth movement of the carriage with the camera in the housing, the above-mentioned slide cushions are preferably used, which are in particular composed of thermoplastics of the polyoxyethylene/polyacetal substance group, e.g. POM material. These slide cushions can be more or less stretched over the strut-shaped guide means on the carriage and are embodied, for example, as band-shaped or as comparable to wide rubber bands.

This arrangement has the additional advantage that if wear is present, then it is only necessary to remove the slide cushions and replace them with new ones, which are stretched onto the strut-shaped guide means. It is thus possible to reliably prevent potential mechanical wear. The slide cushions themselves can be provided with a corresponding coating that significantly reduces adhesion and sliding friction.

In order to improve the installation of the carriage with the camera installed in the camera device, the housing can be composed of at least two parts. In this connection, it is furthermore conceivable for the housing to be composed of a front housing part and a rear housing part. It is likewise conceivable for other housing parts to be added if the housing is not merely composed of two parts. However, in order to reduce the number of housing parts as much as possible, it is advisable to use a two-part housing part [sic]. The front housing part in this case accommodates the camera lens and the bulk of the camera with the corresponding carriage. The rear housing part, on the other hand, contains the rest of the carriage and the camera. The latter particularly also contains the transmission mechanism in order to be able to move the carriage with the camera back and forth. Thus, the rear housing part can contain a driver that the drive unit rotates about a fixed rotation axis. By means of this rotation, the driver can drive the carriage back and forth. The driver here is fastened to the carriage by means of a fastening element.

According to the invention, it is also conceivable for the above-mentioned housing to have an opening through which the camera cable passes. In this case, the opening is embodied so that it enables a relative movement of the camera cable inside the opening. The opening is advantageously embodied as an oblong hole and a connecting line between the front and rear housing parts extends through this opening in order make the carriage with the camera even easier to install. In addition, the opening for the camera cable can be provided with an additional sleeve, which completely or partially closes the opening. The camera cable itself can be routed into the housing through the additional sleeve so that an additional protection for the cable is provided in the region of the opening in the housing. The additional sleeve is embodied as more or less funnel-shaped, with the narrow part of the funnel-shaped end of the additional sleeve enclosing the camera cable in a sealed fashion. The widened and funnel-shaped end of the additional sleeve in turn rests against the edge of the oblong hole-shaped opening in the housing and functions as a longitudinal guide for the camera cable. The additional sleeve can be clamped in a groove at the edge of the opening in the housing in order to likewise achieve a sealing action.

With the present invention, it is possible for the carriage to be moved into an auxiliary position in addition to the standby position. The carriage therefore has three defined positions, namely the recording position, the standby position, and the above-mentioned auxiliary position. Since all three positions can be reached (merely) by means of a linear movement of the carriage, the auxiliary position can be reached by means of a user manually pushing on the carriage from the outside, on the camera, or on the carriage itself, in the direction toward the housing. Consequently, the auxiliary position can be reached without using the drive unit; in particular, the auxiliary position can be reached exclusively without the use of the drive unit. In other words, the auxiliary position cannot usually be reached using the drive unit of the carriage. Instead, this requires a manual pressure exerted from the outside.

In order to also accommodate the camera inside the camera device in a particularly protected way, it is possible for an opening for the camera, in particular for the lens, especially in the recording position, to be provided in the housing, particularly the front housing part. The image recording takes place through this opening in the front housing part. For this purpose, the camera can also protrude part-way out of the opening itself when it assumes its recording position. In the standby position, however, the carriage with the camera is retracted into the camera device so that the above-mentioned opening in the front housing part can be closed by a movable cover. This cover protects the camera device from environmental influences that can penetrate through the opening. Consequently, in the standby position, the camera and in particular its lens remains protected from environmental influences in its position inside the device. The camera and its camera lens are thus only exposed to environmental influences in the recording position. This reduces the amount of maintenance work that must be performed on the camera, for example due to a soiled lens or mechanics.

In the context of the invention, it is also possible for the cover to be fastened exclusively to the front housing part. For this purpose, a fixed rotation axle can function as a connecting element between the cover and the front housing part; in addition, a return spring for the cover can be provided in order to move the cover from an open position into a closed position automatically (i.e. without using the drive unit). For this purpose, this return spring is likewise positioned between the front housing part and the cover. The cover itself can pivot about a stationary rotation axle; in its open position, part of the cover protrudes into the camera device and the other part protrudes out from it in order to uncover the image recording area for the camera.

In the open position, the cover is in an approximately horizontal position. In order to move the cover from its closed position into the open position, at least one thrust element can be provided inside the cover, which cooperates mechanically with the camera or the carriage, as a result of which the cover is more or less pushed open and is moved from its closed position into the open position when the carriage with the camera is moved from the standby position into the recording position. Ideally, at least one additional thrust element is provided inside the cover in order to obtain a uniform distribution of force between the carriage or camera and the cover when it is pushed out. Since the cover is loaded by the return spring, it is automatically closed as soon as the carriage with the camera moves back into its standby position. For the above-mentioned thrust elements, geometrically corresponding indentations or notches can be provided on the carriage or on the camera, which in particular have inclined surfaces along which the corresponding thrust element can slide.

It is also possible according to the invention for a sealing element, in particular with an indentation, a notch, and/or a cavity, to be provided between the front housing part and the cover in order to permit a simple compression of the sealing element in this position by means of a pressure on the cover resting against it. This sealing element seals the front housing part in the region of the opening with the cover. This sealing element should prevent a soiling of the camera inside the camera device, particularly when there are large pressure fluctuations of the kind that occur due to the headwind of the vehicle when traveling at high speed and due to the use of high-pressure cleaners or the like. The above-mentioned compression of the sealing element is required in order to convert a pressure on the cover resting against it into a slight pivoting movement of the cover (meaning a rotation by a few degrees); this causes the cover to press against the carriage with the camera and to move the latter out of the standby position into the auxiliary position beyond it. Consequently, the sealing element must, on the one hand, be leak-proof in the closed position of the cover and nevertheless flexibly embodied in order to convert a manual pressure, e.g., due to a user of a vehicle pushing on the cover, into a slight rotating motion, which finally causes the carriage to slide in linear fashion into the auxiliary position. Ideally, the sealing edge of the sealing element is embodied as geometrically complementary to a sealing edge of the sealing element [sic], which edges can thus additionally form a labyrinth seal in the closed position.

It is also conceivable in the context of the invention for a movement of the camera from the standby position toward the auxiliary position to trigger a signal by means of the switch element. This signal from the switch element can in particular trigger a vehicle-specific function, such as an opening signal for a rear hatch, door, or the like of the vehicle or a wake-up signal for the vehicle. As mentioned above, the movement of the carriage with the camera can be carried out by means of a manual pressure on the cover in order to thus move the carriage out of the standby position into the auxiliary position. Particularly in this auxiliary position, the switch element is actuated, which triggers the signal. In order to avoid a malfunction of the switch element, it is also possible to provide a plurality of switch elements, which are actuated by the carriage, with the camera in the auxiliary position. A control unit can then check the provided signals of the switch elements for proper function. Ideally, the switch element is positioned in a rear region of the camera device in order to protect it as much as possible from soiling that comes, for example, from the front region with the housing opening for the camera lens.

It is also conceivable according to the invention for at least one switch element to be positioned on the housing, which protrudes at least part-way into the travel path of the carriage; the carriage has at least one triggering element such as a carriage edge and/or a camera housing edge, which, when the carriage with the camera is moved toward the auxiliary position, trips the switch element. Consequently, the triggering element of the carriage or camera acts directly on the switch element in the auxiliary position. As a result, the present invention makes it possible to dispense with an additional control element since the cover of the camera device simultaneously performs this function and thus the switch element is indirectly actuated by means of the triggering element on the carriage with the camera. This arrangement also has the advantage that it is possible to dispense with an additional control element next to the camera, thus making it possible to further reduce the amount of installation space required. This also makes it possible to reduce the number of moving parts so that on the whole, a particularly compact camera device can be achieved.

It is also possible according to the invention for a spring element to act on the carriage, the spring force of which is oriented in the opposite direction from the movement direction of the carriage and toward the auxiliary position. This spring element can ensure that the carriage is moved from the auxiliary position back into the standby position as soon as there is a decrease in the manual pressure that is transmitted from outside by the cover to the carriage or camera. It is thus possible to dispense with the additional use of the drive unit, which also makes it possible to simplify the structural complexity of the camera device.

It is also possible according to the invention for the above-mentioned spring element to be positioned inside a chamber of the housing of the camera device. The spring element can be positioned in this chamber in a slightly pre-stressed fashion, which also makes it possible to fix the spring element in position in the chamber. It is also conceivable for the carriage to have a projection that contacts the spring element as a result of which the carriage is pushed out of its auxiliary position into the standby position.

It is optionally conceivable for the chamber for the spring element to have an opening through which the projection of the carriage extends when it is moved toward the auxiliary position. By means of this, the camera can more or less clamp the spring element at both ends, and the spring element is only contacted by the carriage or camera by means of the projection that can protrude through the opening in the camera. It is thus possible to achieve a reliable return of the carriage with the camera from the auxiliary position to the standby position. In this case, the spring force of the spring element acts on the carriage with the camera until it has reached the standby position. In the standby position, the spring force of the spring element is minimal to non-existent.

It is also possible according to the invention for the cover to be actuatable only by means of the camera and/or carriage when switching from the standby position into the recording position. Consequently, the cover itself is embodied without a drive unit and is only actuated indirectly by means of the camera with the carriage. The return is carried out by the corresponding return spring as soon as the carriage with the camera has switched into the standby position. This permits a particularly simple design of the camera device that also has a low susceptibility to malfunction.

It is also conceivable according to the invention for the drive unit and/or at least one transmission mechanism to be positioned laterally next to the housing for the carriage. The lateral arrangement of the drive unit and/or at least of a transmission mechanism, it is possible to achieve the fact that the installation depth is minimized. In this case, it is also possible for the transmission mechanism to be provided between the drive unit and the carriage in order to achieve a particularly compact design of the camera device. The transmission mechanism in this case can also be partially accommodated in the housing.

In the context of the invention, it is also conceivable for a pressure exerted on the closed cover for the camera to be able to actuate another or optional switch element in order to produce at least one signal; the camera itself stays in the standby position and is not moved into an auxiliary position. To this end, the corresponding switch element can be positioned in stationary fashion below the camera, in particular below the camera carriage on the housing, particularly in a front housing part, and in particular for it to be directly or indirectly actuated via an actuating means. If an indirect actuation of the switch element via the actuating means is carried out, then a simple and optimal sealing of the switch element can take place. For this purpose, the actuating means cooperates with a seal so that no moisture can penetrate through a guide of the actuating means to the switch element or to the interior of the housing. Ideally, the housing, in particular the front housing part, is embodied in the form of an injection-molded plastic component so that the socket for the switch element can also be produced in a single production step or injection-molding step with the housing. The actuating means is advantageously embodied in the form of a longitudinally movable slide element and is positioned in or on the housing. In order to increase the pressing force of the cover on the actuating means, the switch element is positioned with the actuating means in the middle, below the camera, on or in the housing. Since the rotation point or rotation axis of the cover can be positioned in the upper third, this produces a lever system by means of which it is possible to increase the pressing force on the switch element. The switch element can trigger a signal that can trigger a vehicle-specific function, for example (see description below).

In the context of the invention, it is also conceivable for the decorative ring for the camera device on the outside of the vehicle to be connected to the camera device or to the vehicle body by means of an interlocking or clip connection. This decorative ring can contain ABS plastic (ABS stands for acrylonitrile butadiene styrene) as an essential component and can be provided with a chromium layer in order to produce a pleasing appearance. Ideally, the decorative ring is not directly connected to the vehicle body or to the camera device since an interlocking connection made of ABS plastic material involves technical problems since the interlock projections break easily. It is therefore advantageous for a corresponding decorative ring to be connected to the vehicle body or camera device, in particular the housing thereof, in a form-fitting manner indirectly by means of two annular shells. In this case, these two annular shells can comprise at least a part of the interlocking connection, particularly in the form of interlocking elements, and can engage with the decorative ring in a form-fitting manner by means of projections at the back in order to fasten it securely to the vehicle, in particular to the camera device. In order not to deform or even destroy the decorative ring, the two annular shells are embodied as structurally separate from each other and engage in the inner edge of the decorative ring at diametrically opposite sides on the left and right or at the top and bottom, in order to fasten the decorative ring to the vehicle indirectly via the interlocking connection with the annular shells. Ideally, an additional seal is provided between the decorative ring and the body panel so that the paint of the vehicle body is protected and moisture cannot penetrate into the interior of the vehicle through the opening in the vehicle body.

In the context of the invention, it is also conceivable for essential components or assemblies of the camera device according to the invention to be manufactured in the form of injection-molded plastic parts. It is thus possible, for example, for the entire carriage, the transmission mechanism, the housing, and large parts of the drive unit to be composed of injection-molded plastic parts.

Figure 2:
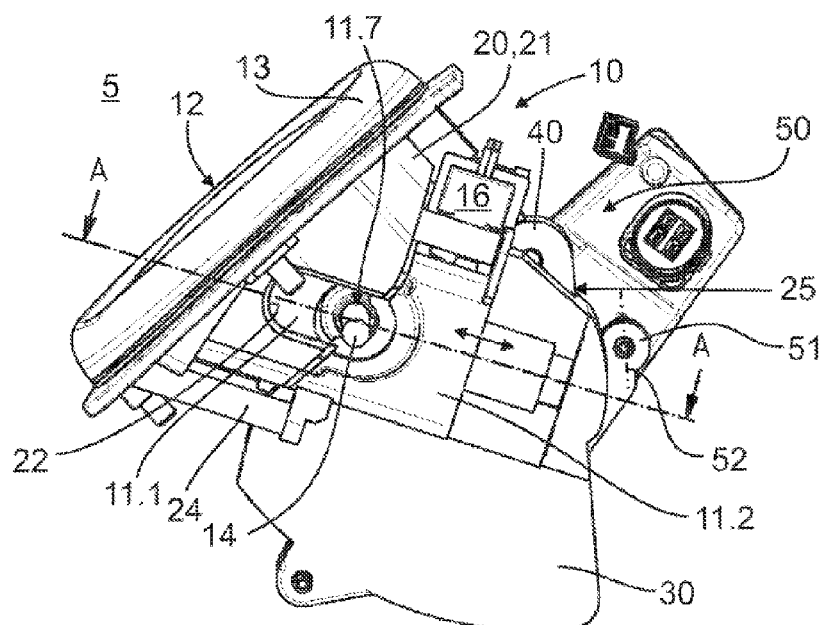
Figure 3:
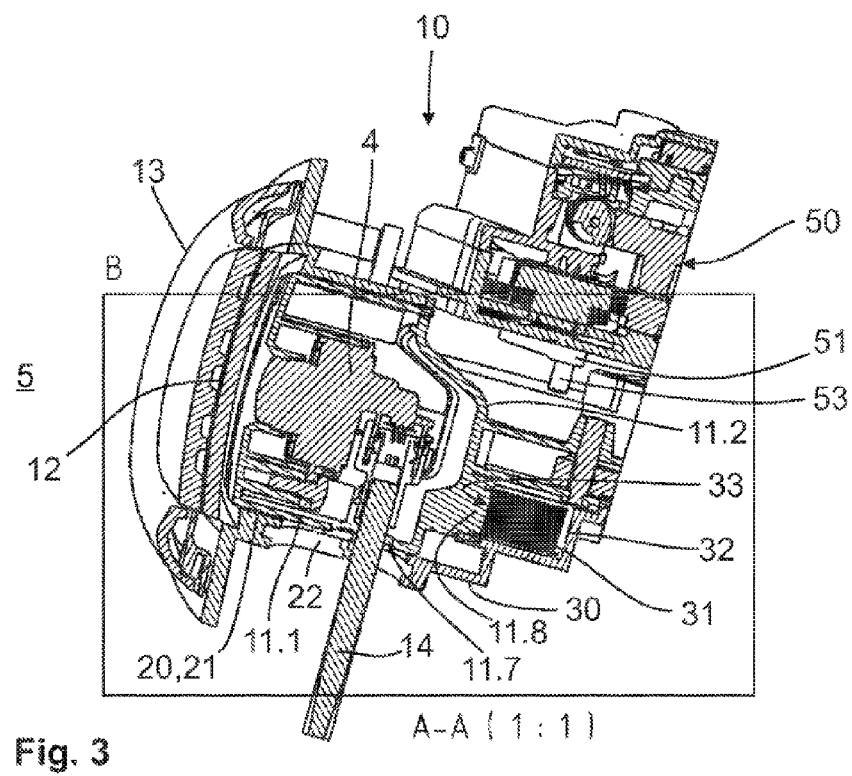
Figure 4:
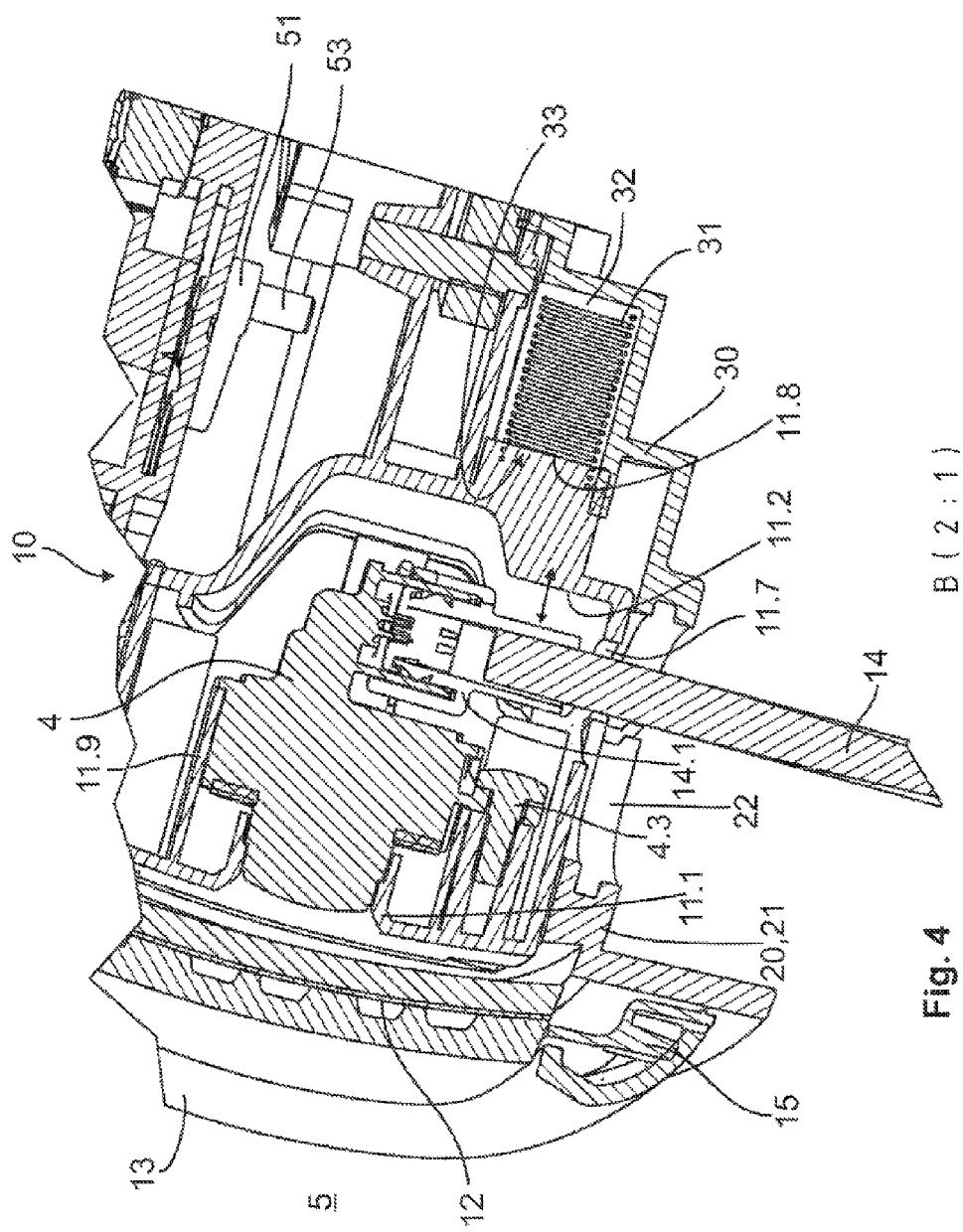
Figure 5:
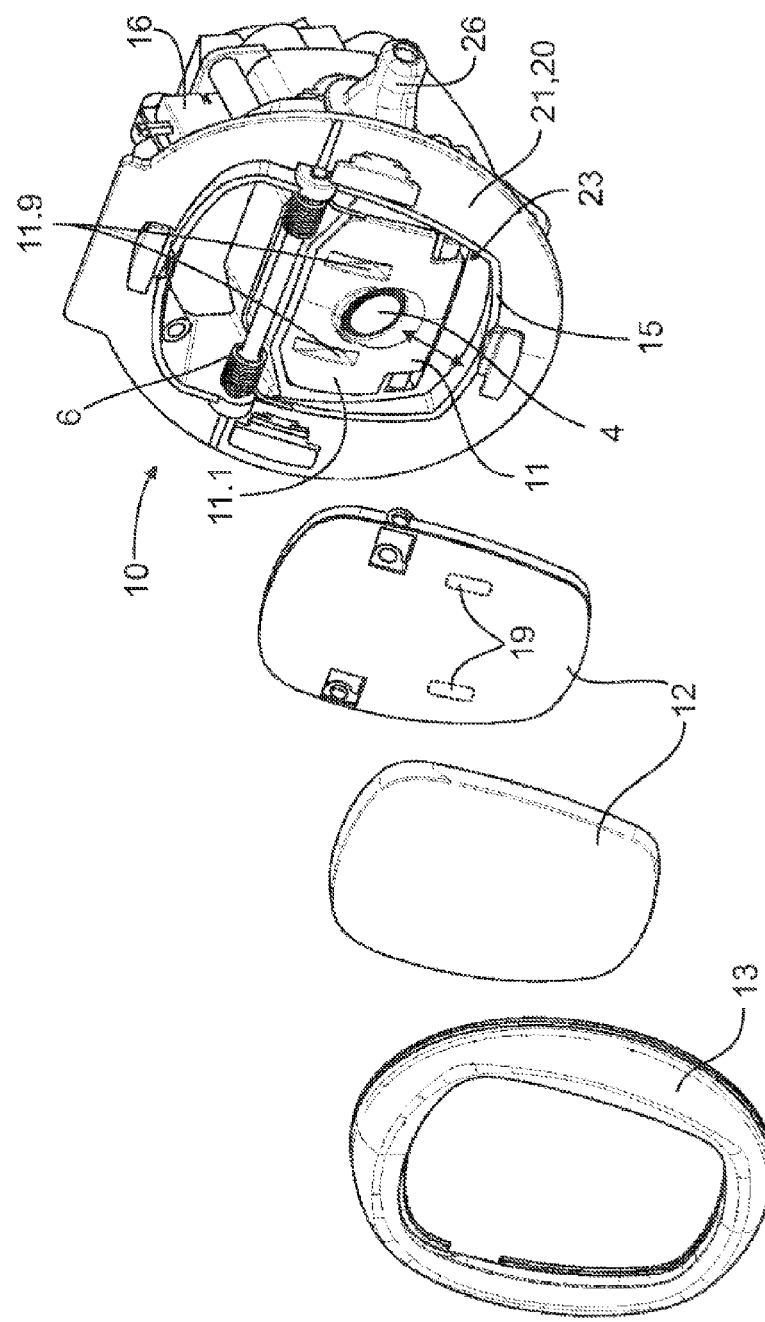
Figure 6:
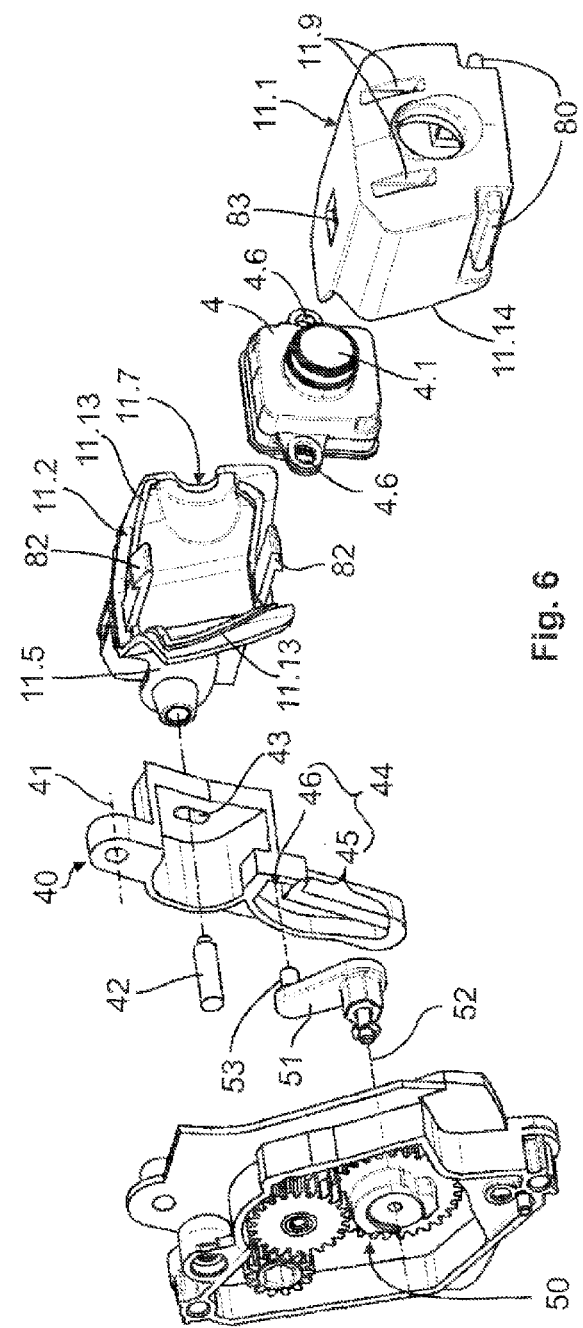
Figure 7:
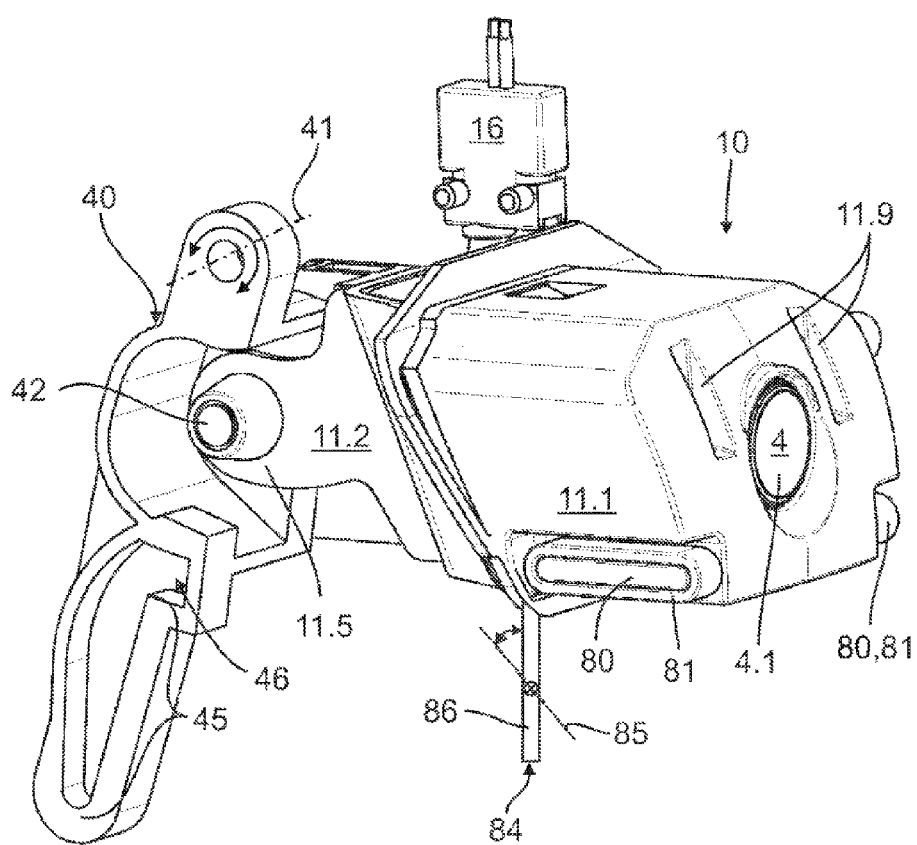
Figure 8:
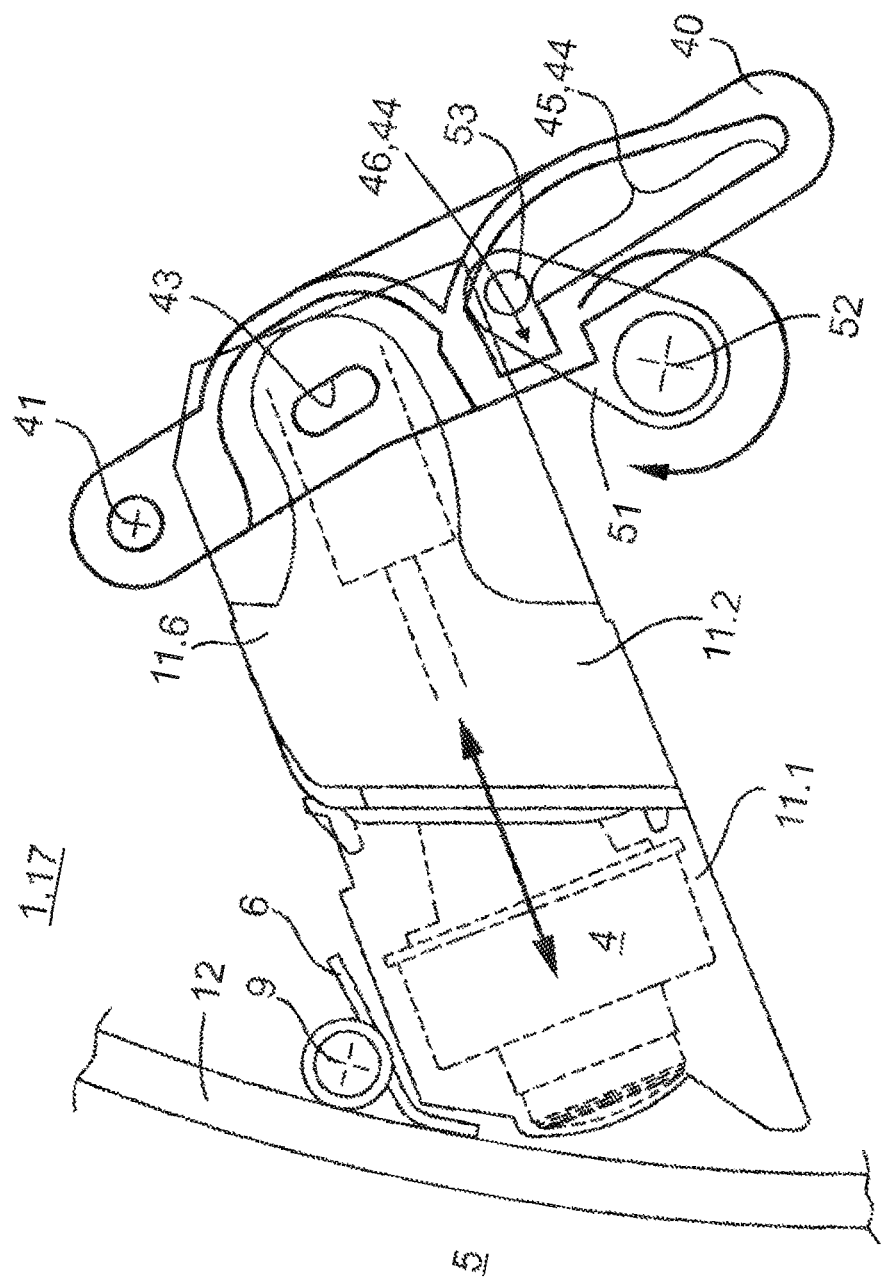
Figure 9:
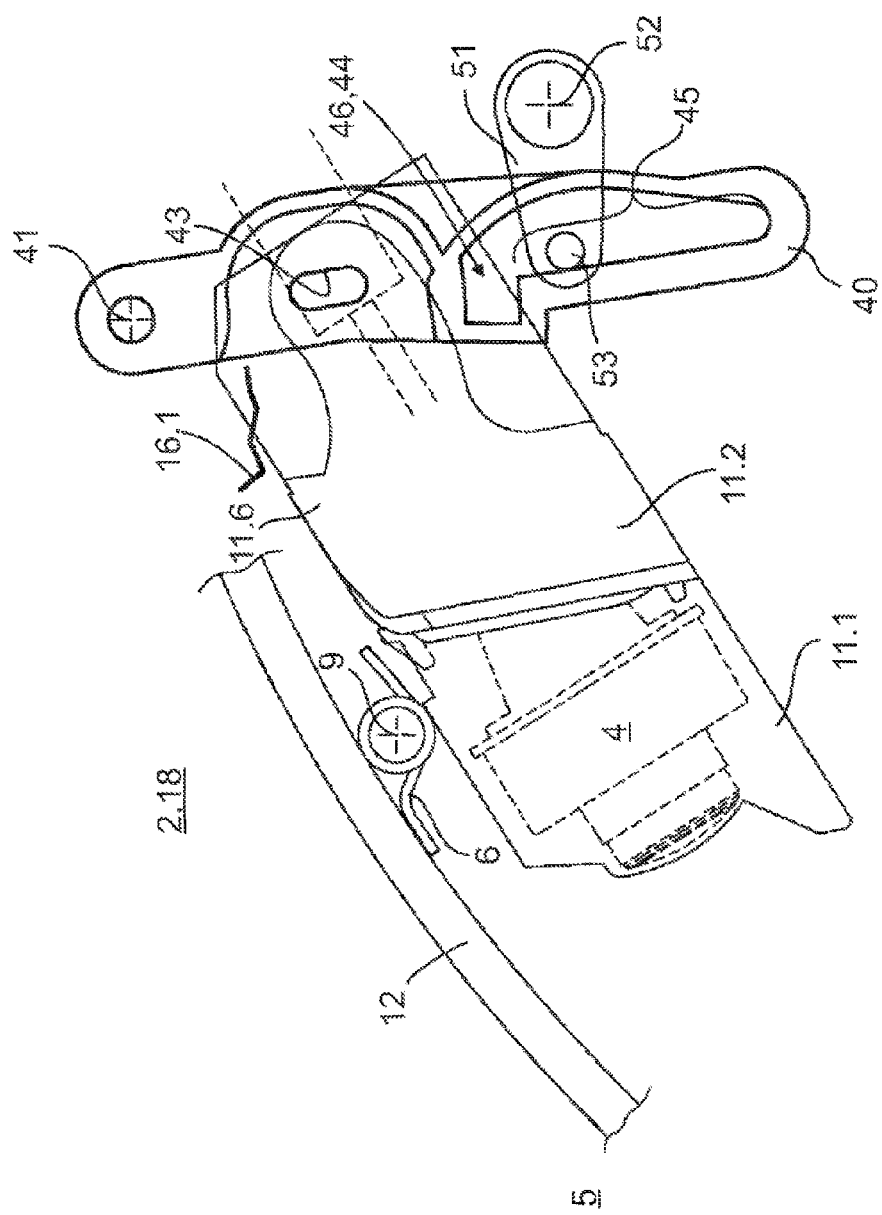
Figure 10:
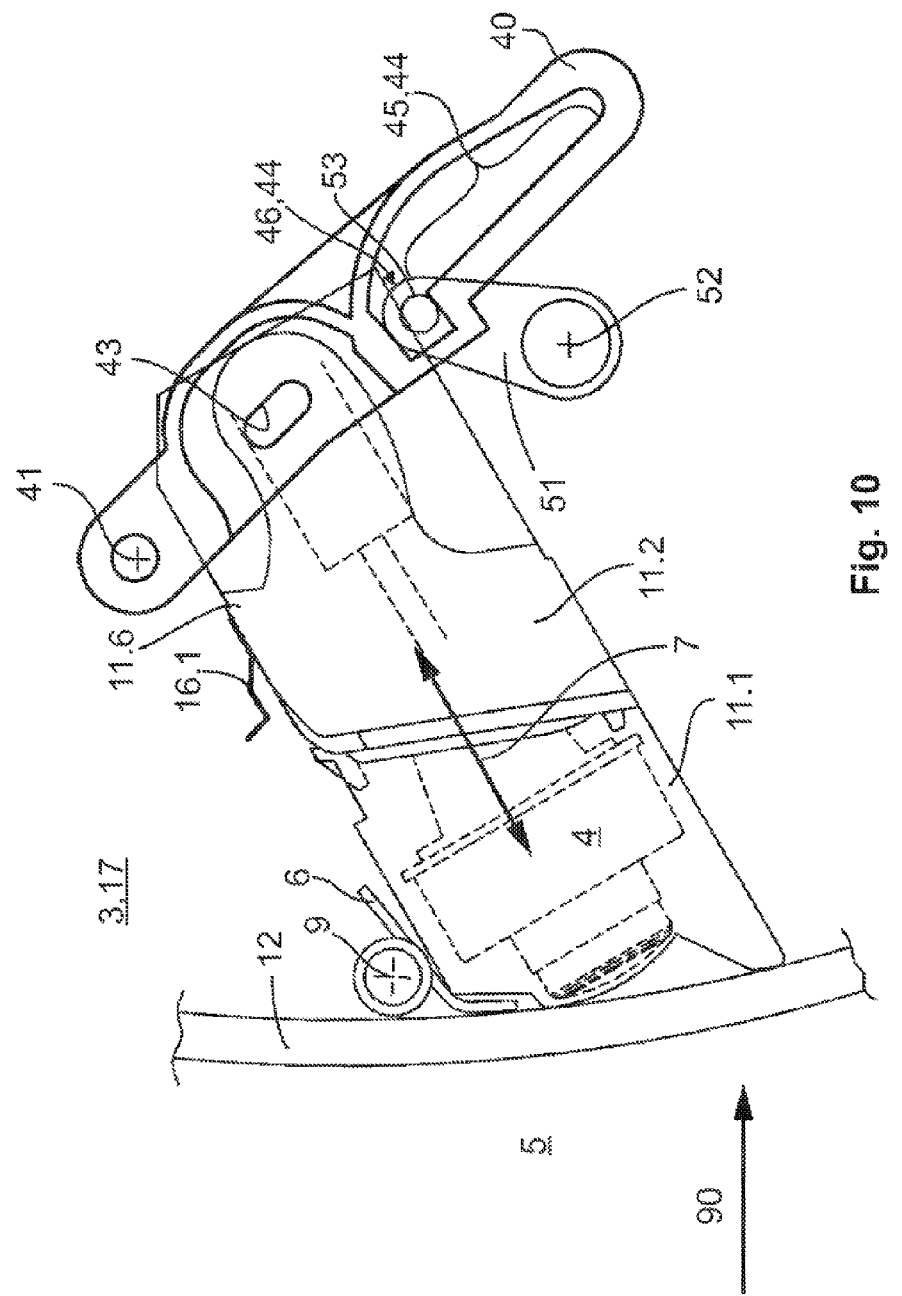
Figure 11:
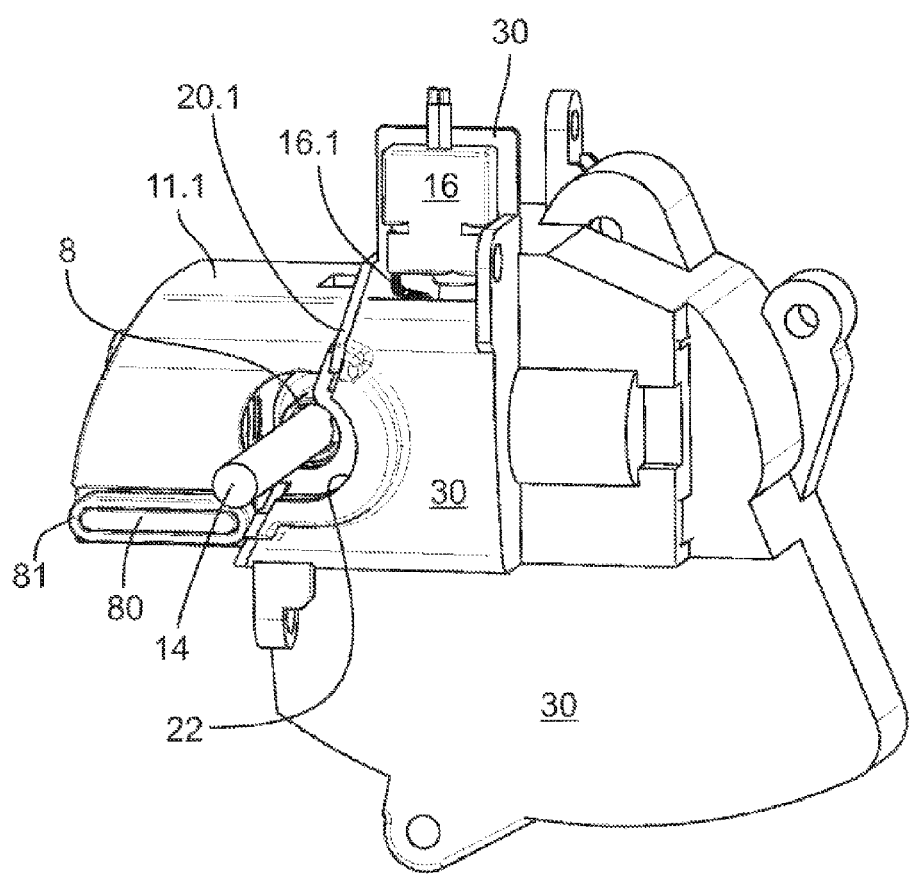
Figure 12:
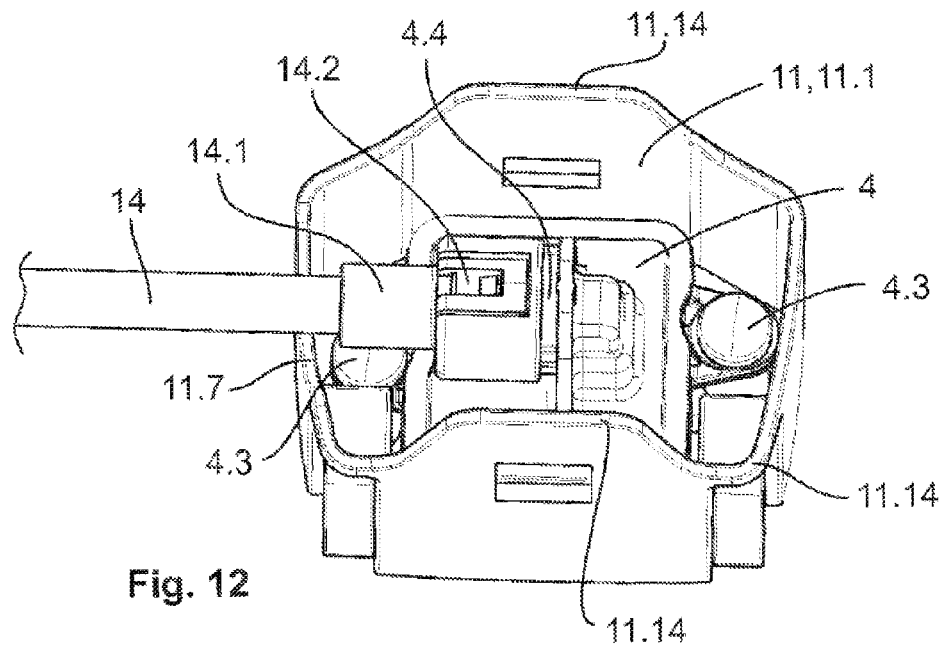
Figure 13:
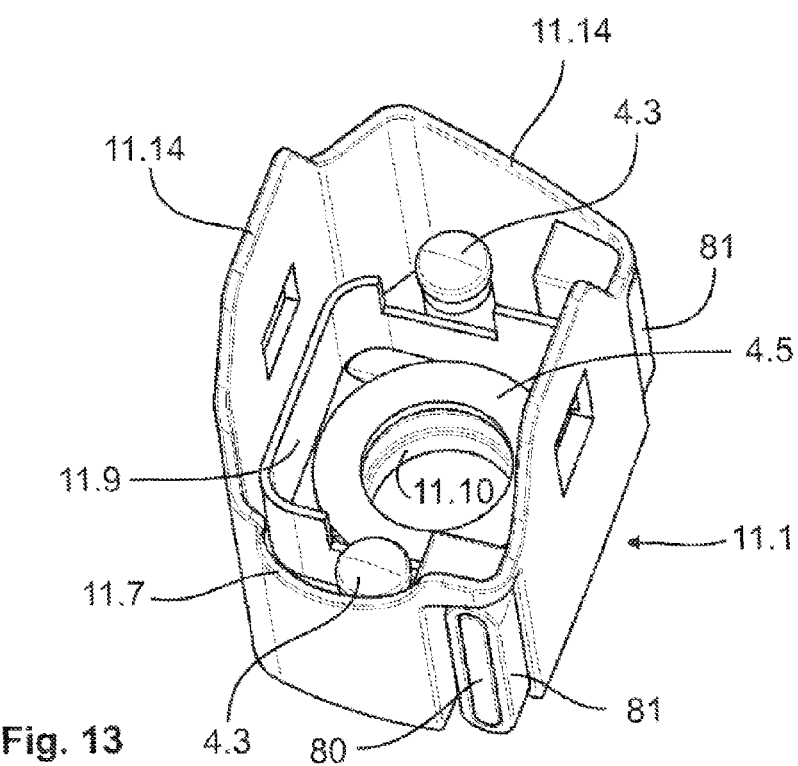
Figure 14:
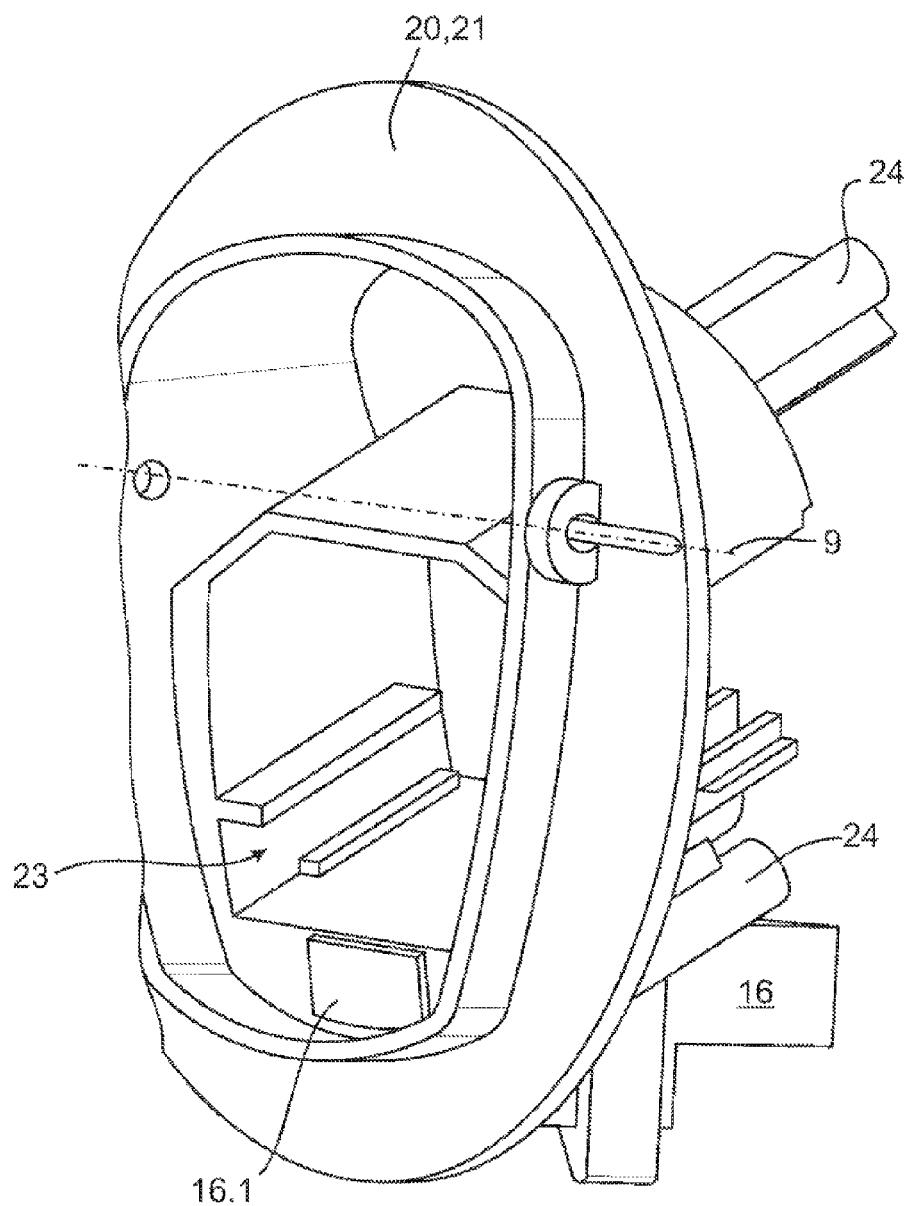
Figure 15:
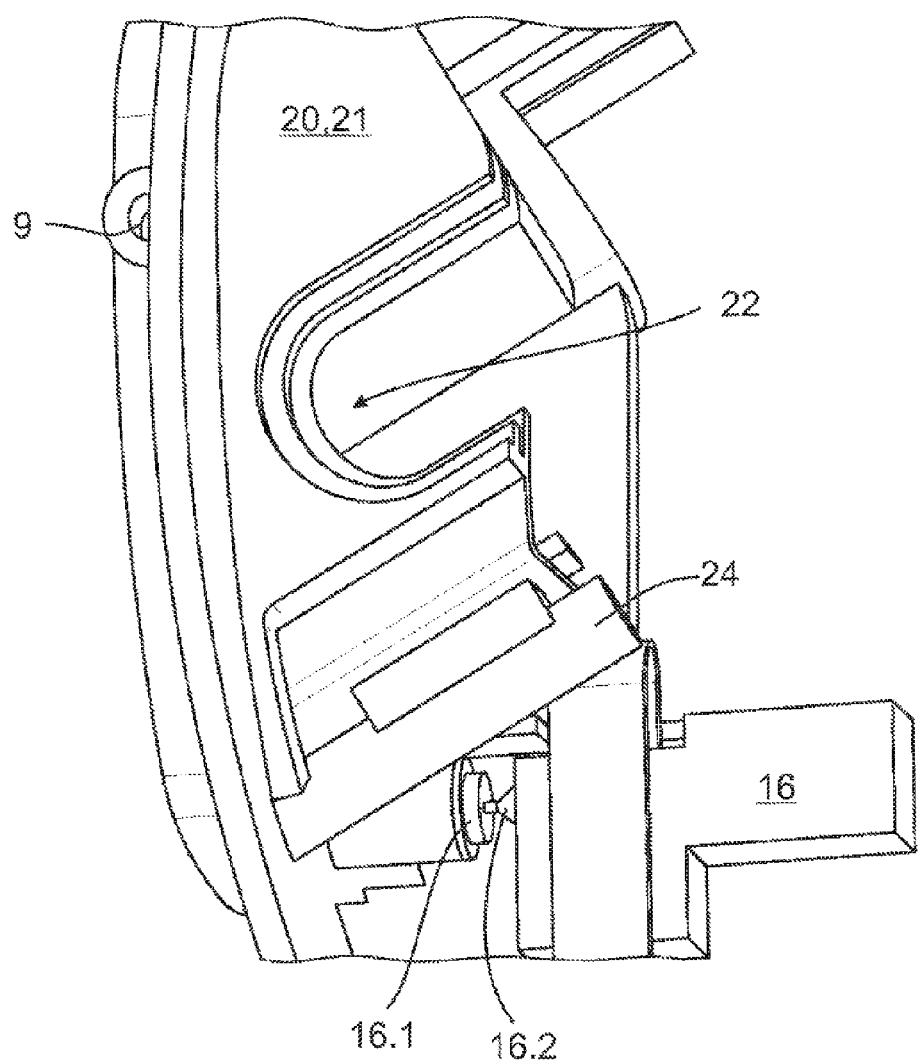
Figure 16:
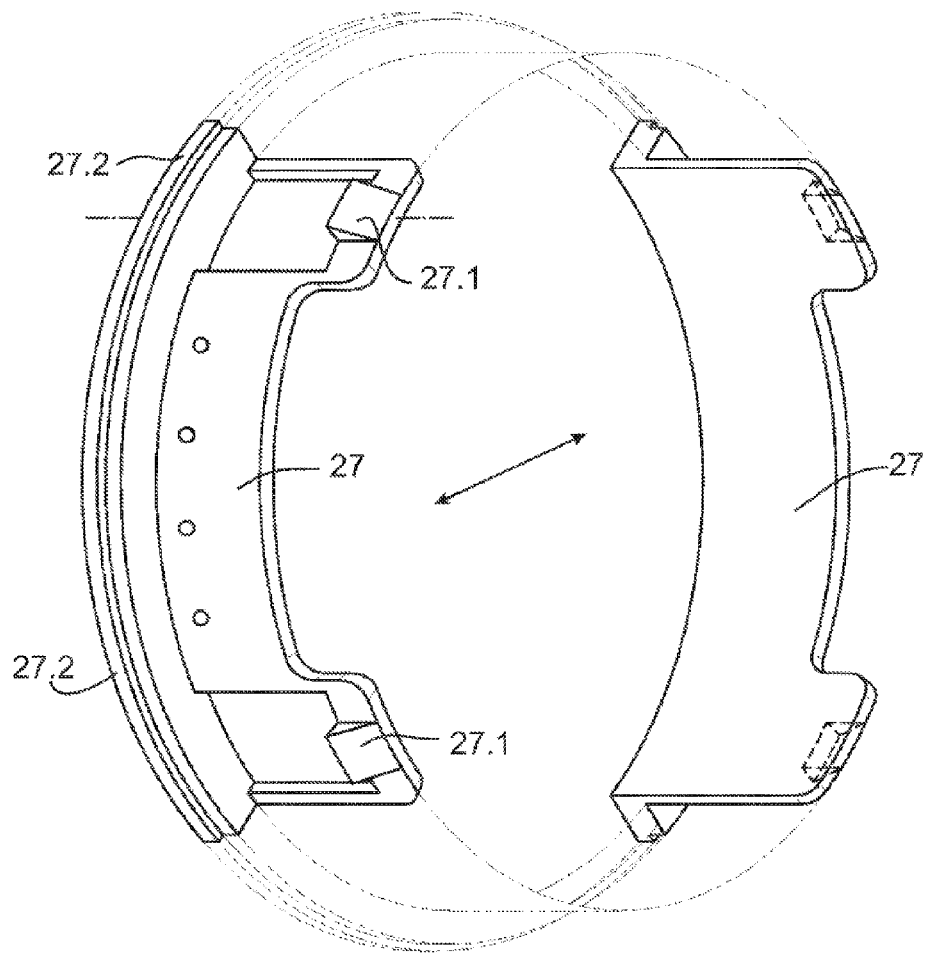
Figure 17:
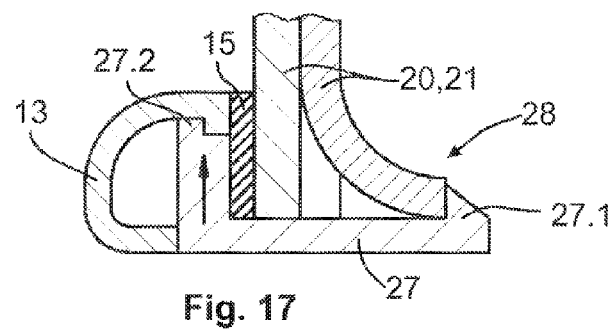

According to the invention, the features of the description and claims and the device according to the invention can be essential to the invention in and of themselves and in a wide variety of combinations. Other measures that improve the invention will be explained in greater detail below together with the description of a preferred embodiment of the invention based on the drawings. In the drawings:

FIG. 1 is a three-dimensional view of the camera device according to the invention in which the housing for the carriage is composed of two parts and the rear housing half is not shown in order to provide a view into the interior, FIG. 2 shows a right side view of the camera device from FIG. 1, but with a closed housing, i.e. with the front and rear housing parts assembled, FIG. 3 shows a section A-A through the camera device from FIG. 2, with the camera in a standby position and a cover in a closed position in front of the housing opening provided for the camera, FIG. 4 shows an enlarged detail of the region B of the camera device from FIG. 3, FIG. 5 is a partially exploded view of the camera device according to the invention, viewed from the right front, depicting a decorative ring and a cover, with a separately shown cap, FIG. 6 is an exploded view of a drive unit, which drives a carriage of the camera device according to the invention via a transmission mechanism, FIG. 7 is a three-dimensional view of an assembly of the camera device from the left front, having a driver that is fastened to the carriage for the camera, FIG. 8 is a schematic view of the camera device in a standby position, FIG. 9 is a schematic view of the camera device in a recording position, FIG. 10 is a schematic view of the camera device in an auxiliary position, FIG. 11 is a three-dimensional side view from the back, right of an assembly of the camera device, with an installed carriage, in which the camera is arranged and the lateral camera cable protrudes, mounted in the rear housing part, FIG. 12 is an inside view of a first carriage part with a mounted camera and a laterally connected camera cable;

FIG. 13 is an inside view of a first carriage part without the mounted camera, FIG. 14 is a three-dimensional view from the front of the housing of the camera device according to the invention without the camera, but with an actuating means for a switch element, FIG. 15 is a three-dimensional view of the housing part of the camera device from FIG. 14, showing the switch element, FIG. 16 shows two annular shells for fastening a decorative ring of the camera device to the vehicle, and FIG. 17 is a schematic depiction of the fastening of the decorative ring from FIG. 16 in a sectional view.

In the following figures, identical reference numerals are used for the same technical features of different exemplary embodiments or variants.

The figures show one possible embodiment of a camera device 10 according to the invention, which is used as a park assist system for a motor vehicle. The camera device 10 has a drive unit 50, which is connected to a camera 4 via a transmission mechanism. The camera 4 can be moved between a retracted position 1, an extended position 2, and an auxiliary position 3. In the retracted position 1, the camera 4 is in the standby position 1, where no recording of the outside area 5 is taking place. During the parking procedure, the camera 4 is moved into its extended position 2 (recording position 2) in order to provide the user with image data that relate to the area 5 outside the motor vehicle.

The camera 4 is contained inside a carriage 11, which functions as an inner camera housing or casing. While the camera 4 is in the respective position 1, 2, 3, a simultaneous movement of the carriage 11 in a movement direction 7 takes place; in the exemplary embodiment shown, the carriage 11 is affixed to the camera 4.

In the present exemplary embodiment, the carriage 11 is composed of two parts, with the camera carriage 11 being composed of a first part 11.1 and a second part 11.2. At the side, an opening 11.7 in the carriage 11 is provided, through which an electrical line or a camera cable 14 extends, which is electronically connected to the camera 4 inside the camera carriage 11 by means of a plug 14.1 with an interlocking connection 14.2 (see the detail view in FIG. 12). One advantage of the two-part camera carriage 11 is that the camera 4 can be mounted in the camera carriage 11 in an easy-to-mount way.

As is shown in the drawings, the transmission mechanism is embodied in such a way that by means of a manual actuation from the outside 5 (in the direction of the arrow 90), in addition to the retracted position 1, the camera 4 can be moved into another auxiliary position 3 that is shown in FIGS. 8 through 10. By moving the camera 4 from the retracted position 1 toward the auxiliary position 3, it is possible to trigger a signal by means of the switch element 16, which can trigger a vehicle-specific function. In the present exemplary embodiment, the signal serves, for example, to permit the rear hatch to be opened. According to FIGS. 1 through 4 and FIG. 10, the user pushes on the camera device 10 in the direction of the arrow 90, in particular on the cover 12 of the camera device 10, which is in the closed position 17 according to FIGS. 1 through 4. In the extended position 2 of the camera 4, the cover 12 is in the open position 18. The cover 12, which is attached to the camera device 10 in rotary fashion by means of a rotation axle 9, is acted on by at least one (return) spring 6 so that the cover 12 is able to reliably travel automatically from the open position 18 back into the closed position 17 when the camera 4 is moved toward the retracted position 1.

As is clear from FIGS. 8 and 9, the cover 12 in this case pivots with its upper region into the camera device 10 and protrudes from the camera device 10 with the lower region of the cover. Consequently, a corresponding open space above the camera 4 is provided in the camera device 10 according to the invention, into which the upper region of the cover 12 can pivot in order to assume its open position 18.

The carriage 11 has an opening 11.7 at the side, through which the camera cable 14 extends to the camera 4. According to the invention, the camera carriage 11 is also enclosed by a housing 20, which in the present exemplary embodiment is composed of two parts. In this case, the housing 20 has a front housing part 21 and a rear housing part 30, which housing can be reliably assembled by means of at least one connecting element 24, preferably four connecting elements 24. The front housing part 21 is oriented toward the cover 12 and the rear housing part 30 is oriented toward the drive unit 50. The front housing part 21 has an opening 23, which is oriented toward the cover 12. In the retracted position 1 or in the auxiliary position 3, the cover 12 covers the opening 23. In the extended position 2 of the camera 4, however, the cover 12 is in the open position 18; the opening 23 is visible from the outside 5 and the camera 4 extends at least part-way through the opening 23. The housing 20 also has a lateral opening 22 through which the cable 14 extends. The opening 22 is covered by a cap 26 that also has a sealing function. The opening 22 is embodied as enlarged so that when the carriage 11 is moved, the cable 14 can reliably move in the opening 22. The opening 22 thus offers a sufficiently large amount of movement clearance for the cable 14. According to FIGS. 1 and 7, the carriage 11 is supported in movable fashion inside the housing 20; the housing 20 has a guide element 34 in which the carriage 11 is guided during the movement between the positions 1, 2, 3. The carriage 11, in particular the first part 11.1 of the carriage 11, has a mount 80, which is movably supported inside a guide element 34 of the housing 20. According to the first exemplary embodiment, a band 81 (or slide cushion 81) encompasses the mount 80; the band 81 is preferably made of POM material (as described above). When the camera 4 is moved into the respective position 1, 2, 3, the band 80 moves inside the guide element 34 of the housing 20. As shown in FIG. 7, the first part 11.1 of the carriage 11 is equipped with the above-described mount 80 on both sides, each of which is encompassed by a band 81. It has turned out that during the movement of the carriage 11, no noise is produced inside the guide element 34 of the housing 20. In addition, such a support of the carriage 11 in the housing 20 experiences very little wear.

FIG. 2 shows that the housing 20 has a receptacle 25, which movably accommodates at least one transmission mechanism for moving the carriage 11 into its respective position 1, 2, 3. The transmission mechanism is operatively connected to the drive unit 50; for example, the drive unit 50 can be an electric motor. The transmission mechanism can have a driver 40 that is embodied as shown FIG. 2, which is positioned in the receptacle 25 of the rear housing part 30.

According to the exemplary embodiment, the drive unit 50 has a drive element 51, which can be moved about an axis 52. In addition, the drive element 51 is embodied with a cam 53, which engages the driver 40. The driver 40 has a sliding guide 44 and is supported in rotary fashion about the axis 41. The cam 53 travels inside the sliding guide 44 when the camera 4 moves into its respective position 1, 2, 3.

FIG. 8 shows the retracted position 1 of the camera 4. The cam 53 is in a first region 45 of the guide 44. If the drive unit 50 executes a clockwise movement of the drive element 51, then the cam 53 travels inside the sliding guide 44, in particular inside the first region 45 until it reaches the position shown in FIG. 9. As the drive element 51 pivots in the clockwise direction about the axis 52, a movement of the driver 40 in the clockwise direction about the axis 41 occurs. Spaced apart from the axis 41, the driver 40 is connected to the carriage 11 by means of a fastening element 42. This is in particular shown in FIGS. 6 and 7. These show that the fastening element 42 is able to move inside a compensation contour 43 of the driver 40.

The compensation contour 43 in the present exemplary embodiment is an oblong hole.

The fastening element 42 can, for example, be a rivet connection.

A retraction of the camera 4 from the extended position 2 into the retracted position 1 can take place in that the drive unit 50 rotates the drive element 51 counterclockwise from the position shown in FIG. 9 until the position that the drive element 51 assumes in FIG. 8 has been reached. If the user now performs a manual actuation of the carriage 11 from the outside, then the carriage 11 is moved from the retracted position 1 into the auxiliary position 3, which is shown in FIG. 10. In this case, the sliding guide 44 is embodied so that the carriage 11 with the driver 40 mounted on it can be reliably moved into the interior of the vehicle without the occurrence of an unwanted collision with stationary transmission mechanisms, e.g. the drive element 51. For this reason, the sliding guide 44 has a second region 46, which is another recess inside the driver 40; the recess extends toward the cover 12. By contrast with the second region 46, the first region 45 of the sliding guide 44 extends longitudinally and in the direction away from the axis 41 of the driver 40. One side of the first region 45 is also partially embodied in the form of a segment of a circle so that when the drive element 51 is rotated clockwise from the position in FIG. 8, the driver 40 at first remains in its position. This produces a freewheeling action that can be advantageous particularly with the selection of simple, inexpensive electric motors. Only after a certain rotational position of the drive 50 and drive element 51 has been reached does the cam 53 entrain the driver 40 in the clockwise direction, which causes a movement of the carriage 11. The movement of the carriage 11 in the exemplary embodiment shown is advantageously a linear movement between the respective positions 1, 2, 3.

As is also clear from FIGS. 9 and 10 of the present exemplary embodiment, a movement of the carriage 11 from the recording position 2 through the standby position 1 into the auxiliary position 3 actuates the switch element 16. In FIGS. 9 and 10, the only part of the switch element 16 shown is the actuating means 16.1, which is embodied in the form of a switching lug. In FIG. 9, the actuating element 16.1 is not touched by the switch element 16, i.e. it has no contact with the camera 4 or the carriage 11. If the carriage 11 with the camera 4 is then moved from the recording position 2 or the standby position 1 into the auxiliary position 3, which is shown in FIG. 10, then the triggering element 11.6 of the carriage 11 comes into contact with the actuating means 16.1, which pushes the latter upward. This causes an actuation of the switch element 16 to occur, which produces the desired switching signal. For this purpose, the carriage housing 11 is provided with a step that functions as a triggering element 11.6 for the corresponding actuating means 16.1 of the switch element 16. Once the spring element 31 has moved the carriage 11 from the auxiliary position 3 into at least the standby position 1, then the triggering element 11.6 releases the actuating means 16.1 of the switch element 16 again, which stops the corresponding switching signal. The movement of the carriage 11 with the camera 4 from the standby position 1 into the auxiliary position 3 is carried out by means of a manual pressure in the direction of the arrow 90 toward the cover element 12, as described above.

FIGS. 3 and 4 show that a spring 31 acts on the carriage 11 in order to move the carriage 11 from the auxiliary position 3 back into the retracted position 1 again. The spring 31 is contained in a chamber 32 of the housing 20, in particular of the rear housing part 30; the chamber 32 is provided with an opening 33 into which a projection 11.8 can be inserted. In the retracted position 1 of the camera 4, the spring element 31 preferably does not exert any force on the projection 11.8. Only with the movement toward the auxiliary position 3 does the projection 11.8 come closer to the spring element 31. If the user is no longer exerting any force on the carriage 11, in particular on the cover 12, then the spring force of the spring 31 that acts on the projection 11.8 causes the carriage 11 with the camera 4 to move back into the retracted position 1.

It is also conceivable that the auxiliary position 3 can be secured by means of interlocking elements, which is not explicitly shown. As shown in FIGS. 1 and 2, the camera device 10 is provided with a switch element 16, which is positioned above the carriage 11. The switch 16 protrudes at least part-way into the travel path of the carriage 11. In addition, the carriage 11 has at least one triggering element 11.6, which, when the camera 4 is moved toward the auxiliary position 3, trips the switch element 16. The switch element 16 is affixed to the housing 20. If the switch element 16 is activated, then this triggers a signal that can trigger a vehicle-specific function.

As shown in FIG. 5, the movable cover 12 has thrust elements 19 on the inside, which act on the camera 4 from the outside 5 when manually actuated. The thrust elements 19 engage in sockets 11.9; when the camera 4 is moved outward into the extended position 2, the thrust elements 19 slide into the sockets 11.9 and provide a corresponding guidance during the movement of the cover 12. The thrust elements 19 are positioned on the inside of the cover 12 and extend in projection-like fashion toward the carriage 11.

According to FIG. 7, the carriage 11, in particular the second part 11.2, is embodied with a holding element 11.5 through which the fastening element 42 extends. In the region of the opening 23, there is a seal 15 against which the cover 12 rests in the closed position 17 (see FIG. 5). The seal 15 in the present exemplary embodiment is a labyrinth seal that produces an effective seal. A decorative ring 13 extends outward from the vehicle in projection-like fashion in order to protect the cover 12 and the corresponding seal 15 from being directly sprayed by water.

FIG. 7 shows a crash lock 84, which can be moved between a standby position 85 and an active position 86. As a rule, the crash lock 84 is in the standby position 85 so that the carriage 11 can be moved into its respective positions 1, 2, 3. In the event of an accident, acceleration forces can act on the motor vehicle, in particular on the camera device 10, so that an unwanted movement of the carriage 11 toward the auxiliary position 3 can occur. This would trip the switch 16 in an unwanted fashion. In order to prevent this, the crash lock 84 flips from its standby position 85 into the active position 86 and immediately acts on the carriage 11 in such a way that the crash lock 84 in its active position 86 prevents the carriage 11 from traveling toward the auxiliary position 3. By way of example, FIG. 7 shows the crash lock 84 in its active position 86, with the design of the crash lock 84 shown in very schematic fashion. Naturally, it is conceivable for the crash lock 84 to act on the carriage 11 in a different way. As a rule, the crash lock 84 has a weight, which, due to of inertia, is moved more quickly toward the active position 86 than the carriage 11 would move.

FIG. 11 is a three-dimensional depiction of an assembly of the camera device 10 according to the invention, viewed from the right rear (viewed from the direction of the arrow 90). As is clearly visible, the camera cable 14 protrudes out from the opening 22 of the housing 20. In order to be able to mount the camera 4 with the carriage 11 in the housing 20, the housing is composed of two parts. In this case, the connecting line 20.1 between the front housing part 21 and the rear housing part 30 extends through the opening 22. FIG. 11 shows only the rear housing part 30, which accommodates the carriage 11 with the mounted camera 4. As is clearly shown, the opening 22 has sufficient clearance for the movement of the camera cable 14 between the positions 1 through 3. It is also clear that the switch element 16 is positioned on the outside of the second housing part 30, but the switch element 16 is located on the inside of the vehicle body and not outside the vehicle itself (not in the region of the reference numeral 5). It is also clear that the actuating element 16.1 protrudes from the outside of the housing 20 into an inner region of the housing 20 in order to be able to mechanically cooperate with the carriage 11, in particular the triggering element 11.6 when the auxiliary position 3 is reached.

FIG. 4 shows a detail of the front housing part 21 with the opening 22. As is clearly shown, in the region of the opening 22, a groove is arranged, which is provided for accommodating (in a sealed fashion) a funnel-shaped cap or sleeve 26 for the camera cable 14. The corresponding funnel-shaped sleeve 26 is shown in FIG. 5 and the camera cable 14 is routed through it into the interior of the housing 20.

As also shown in FIG. 11, another sleeve 8 for the camera cable 14 is also provided; this sleeve 8 serves to seal the camera cable 14 in the opening 11.7 of the carriage 11. The difference between the sleeve 8 and the sleeve 26 lies in the fact that because of the movement of the camera 4, the camera cable 14 executes a relative movement in the opening 22, which does not happen in the opening 11.7 in the carriage 11. FIG. 11 also shows that the installation depth of the camera device according to the invention is embodied as correspondingly reduced due to the lateral cable port 4.4.

FIG. 12 shows the first camera carriage part 11.1 from the inside, with a camera 4 mounted in position. In this case, the camera 4 is mechanically affixed to the first carriage part 11.1 in a block-shaped or rectangular socket 11.9. In addition, the camera 4 is fastened in a form-fitting or frictional, non-positive fashion by a total of two holding means 4.3. In this case, the holding means 4.3 are embodied as screws. The lateral camera port 4.4 is clearly visible in FIG. 12, with the plug 14.1 of the camera cable 14 connected to it. In order to protect the electrical connection from mechanical impacts, an interlocking element 14.2 is provided on the plug 14.1, which cooperates at least in a form-fitting and/or frictional, non-positive fashion with the cable port 4.4. As is clearly shown in FIG. 6, tabs with openings 4.6 are provided on the left and right sides of the camera housing, next to the camera lens 4.1, through which the holding means 4.3 can be inserted in order to fasten the camera 4 in the first carriage part 11.1. In this case, the tabs with the openings 4.6 positioned on the camera housing are not situated at the level of the camera lens 4.1, as already described above.

FIG. 13 shows that a seal 4.5 is advantageously positioned between the camera 4 and the inside of the first carriage part 11.1 in order to seal the opening 11.10 for the camera lens 4.1 in as water-tight a fashion as possible. Once again the rectangular or block-shaped socket 11.9 of the first carriage part 11.1 is clearly visible in FIG. 13. FIGS. 12 and 13 also show a cutting line 11.14 of the camera carriage 11, which is formed by the assembly of the two parts 11.1 and 11.2. As is also clearly shown in FIG. 13, this cutting line 11.14 does not lie in a single cutting plane.

FIG. 14 is a three-dimensional view from the outside of the housing 20, in particular the front housing part 21 of the camera device 10 according to the invention. In this case, the camera 4 itself is not shown in a socket in the front housing part 21. The cover 12 is also omitted from the drawing for the sake of better visibility. In an alternative embodiment of the invention, however, an actuating means 16.1 in the form of a longitudinally movable sliding element. This sliding element is sealed relative to the housing 20 so that no spray water can penetrate through the guide into the interior of the housing. The actuating means 16.1 itself has a large-area actuating surface on the outside in order to facilitate a mechanical cooperation with the cover, in particular the back side of the cover. FIG. 14 also shows the switch element 16, which can be actuated by the actuating means 16.1. The cover 12 was also intentionally omitted from the depictions in FIGS. 14 and 15 in order to afford a view into the interior of the front housing part 21.

FIG. 15 shows a side view of the front housing part 21 from FIG. 14. In this case, there is a clear view of the oblong hole-like opening 22 for the lateral cable port 44 in the housing part 21. The internal embodiment of the actuating means 16.1 in the form of the longitudinally movable sliding element is also clearly visible. This presses with its plate-shaped end directly on the switch point 16.2 of the switch element 16. The switch element 16 is itself affixed in a socket in the front housing part 21. This socket is embodied as monolithic and as integrally joined to the front housing part 21. This socket is advantageously embodied in the form of an injection-molded component, produced in a single production step together with the rest of the housing part 21. The switch element 16 can be embodied as a pushbutton, a micro-pushbutton, a switch, or the like.

Because of the specific arrangement of the actuating means 16.1 relative to the rotation axle 9 of the cover 12, a lever system is produced so that a light pressure on the cover 12 (in the direction 90) is sufficient to actuate the switch element 16 so as to trigger a signal. With this optionally provided switch element 16, the camera 4 does not have to be moved into its auxiliary position 3. However, this movement of the camera 4 is also not excluded. It is thus optionally possible to add the switch element 16 from FIGS. 14 and 15 to the switch element 16 from FIGS. 1 through 13. It is also possible for only one respective switch element 16, either the one from FIGS. 1 through 13 or the one from FIGS. 14 and 15, to be provided in the embodiment of the camera device 10 according to the invention.

In order to fasten the decorative ring 13 to the vehicle body in the simplest possible way, it is possible to provide two annular shells 27, which are inserted from behind (in the direction oriented away from the vehicle body) and engage the decorative ring 13 internally in a form-fitting way in order to fasten this ring either directly to the vehicle body or to the housing 20 of the camera device 10, see FIG. 16. This fastening can be embodied in the form of an interlocking connection 28, the elements of which are embodied in the form of interlocking elements 27.1 or clips on the annular shells 27. Ideally, each of the annular shells 27 is provided with at least one, preferably several, interlocking elements 27.1. In order to now fasten the decorative ring 13 to the vehicle body, it is sufficient if both of the annular shells 27 engage the decorative ring 13 from behind, i.e., at the rear, and then are pulled diametrically apart from each other (see the arrow in FIG. 16) in order to thus hold the decorative ring 13 in a form-fitting way. To this end, projections, particularly in the form of annular steps 27.2, are provided on the annular shells 27 and cooperate in a form-fitting way with a shoulder on the decorative ring 13 when producing the connection. As soon as the two annular shells 27 engage the decorative ring 13 in a form-fitting way from behind, the two annular shells 27 can be connected via the interlocking elements 27.1 to the vehicle body or to an element of the camera device 10, in particular the housing 20. It is thus easily possible to mount the decorative ring 13 to the outside of the vehicle body. In order to protect the paint of the vehicle body, a seal 15 can also be provided between the vehicle body and the decorative ring 13 and/or a shoulder of the annular shells 27.

FIG. 17 shows the interlocking connection 28 between an annular shell 27 and the device 10 according to the invention, in particular the front housing part 21 of the housing 20. This drawing is a schematic side view of the interlocking connection 28 in the depicted region of the annular shells 27 from FIG. 16. It is also clear here that the annular projection 27.2 of the annular shells 27 cooperates in a form-fitting way with the inner ring (annular edge oriented toward the center point) of the decorative ring 13 when mounted on the vehicle body.

In order to remove the decorative ring 13 from the vehicle body, for example, in order to perform painting procedures or repair work, all that is required is for the interlocking connection 28 to be released from inside the vehicle. Then the decorative ring 13 can be removed from the vehicle body from the outside, together with the two annular shells 27.

Naturally, it is also conceivable for the decorative ring 13 to be integrally joined to the vehicle body; however, this makes repair or maintenance work, particularly under the decorative ring 13, almost impossible to carry out. Also with an integrally joined connection to the vehicle body, it is almost impossible to remove the decorative ring 13 in a non-destructive way.

The invention claimed is:

1. A camera device, in particular for a rear region of a vehicle, the camera device comprising:

a camera;

a carriage mechanically holding the camera;

a drive unit operatively connected via a transmission mechanism to the carriage and operable to move the carriage together with the camera at least between a standby position and a recording position along a movement direction;

a housing in which the carriage is movably arranged by at least one guide;

a movable cover operable to close an opening in the housing in a closed position of the cover when the camera assumes its standby position; and a switch element that can trigger a signal for a vehicle-specific function, characterized in that in the closed position of the cover, a manual pressure on the cover causes a movement of the carriage with the camera, which movement of the carriage with the camera switches the camera from its standby position into an auxiliary position to actuate the switch element in order to trigger the signal for a vehicle-specific function.

2. The camera device according to claim 1, characterized in that the switch element is positioned on the housing and protrudes at least part-way into a travel path of the carriage, the carriage having a triggering element, wherein, when the carriage with the camera is moved in the direction of an auxiliary position, the triggering element trips the switch element.

3. The camera device according to claim 2, characterized in that the switch element is embodied in the form of a pushbutton that in particular has a switching lug as an actuating means, which can be actuated by the triggering element on the carriage in the triggering process.

4. The camera device according to claim 3, characterized in that the switch element is fastened to the outside of the housing, and the actuating means protrudes into an interior of the housing in order to cooperate with the triggering element on the carriage in the triggering process.

5. The camera device according to claim 1, characterized in that the housing is stationary and the carriage is able to move back and forth therein.

6. The camera device according to claim 1, characterized in that the carriage is composed of at least two parts, in particular with a first and second carriage part, and in particular, the carriage constitutes a casing for the camera, the casing having at least openings for a lens of the camera and for a camera cable.

7. The camera device according to claim 6, characterized in that the carriage parts are connected to each other with connecting means, in particular interlocking connections, and, in particular, the connecting means are positioned above and below a camera port.

8. The camera device according to claim 7, characterized in that the connected carriage parts form a closed cutting line; in particular, the cutting line extends in a region of the opening for the camera port; and, in particular, the cutting line is embodied as stepped in order to produce a labyrinth seal.

9. The camera device according to claim 1, characterized in that a camera cable can be connected to the camera by means of a plug, in particular with interlocking elements.

10. The camera device according to claim 1, characterized in that a camera cable can be routed through a sleeve and through an opening in the carriage to the camera, and, in particular, the sleeve is embodied as a kink-prevention sleeve, a sealing sleeve, and/or a tension-relief element.

11. The camera device according to claim 1, characterized in that the carriage with the camera has only a linear movement direction.

12. The camera device according to claim 1, characterized in that the carriage is supported in moving fashion on the housing by means of two guides and the two guides are in particular positioned in a lower region, laterally on the carriage, and, in particular, the two guides on the carriage have strut-shaped guide means that are preferably provided with bands or slide cushions.

13. The camera device according to claim 1, characterized in that the housing is composed of at least two parts, in particular with a front housing part and a rear housing part that comprise the housing, and, in particular, the front housing part is oriented toward the recording position and the rear housing part is oriented toward the standby position.

14. The camera device according to claim 13, characterized in that the housing has an opening through which a camera cable passes and the opening is embodied so that it enables a relative movement of the camera cable inside the opening.

15. The camera device according to claim 14, characterized in that the opening is positioned in the region of a connecting line between the front and rear housing part, and, in particular, the opening can be fully or partially closed by an additional sleeve and the camera cable can be inserted through the additional sleeve into the housing.

16. The camera device according to claim 13, characterized in that the cover is fastened exclusively to the front housing part; in particular, a fixed rotation axle functions as a connecting element; and, in particular, at least one return spring for the cover is provided in order to move the cover from an open position into a closed position.

17. The camera device according to claim 13, characterized in that a sealing element, in particular with an indentation, a notch, and/or a cavity, is provided between the front housing part and the cover in order to permit a simple compression of the sealing element by means of a pressure on the cover resting against it.

18. The camera device according to claim 1, characterized in that a movement of the camera from the standby position toward the auxiliary position can trigger a signal, in particular can trigger a vehicle-specific function, and, in particular, a manual pressure on the cover is required in order to thus move the carriage from the standby position into the auxiliary position.

19. The camera device according to claim 1, characterized in that the cover can only be actuated by the camera or the carriage in a change from the standby position into the recording position.

20. The camera device according to claim 1, characterized in that the drive unit or at least one transmission mechanism is/are positioned laterally next to the housing for the carriage, and, in particular, the transmission mechanism is provided between the drive unit and the carriage.

21. The camera device according to claim 1, characterized in that sealing elements are positioned between the camera and the carriage, as a result of which the camera is enclosed in a particularly water-tight fashion.

22. The camera device according to claim 1, characterized in that the camera is mounted to the carriage by means of at least one holding means, and, preferably, at least two holding means are provided, which are in particular positioned at different heights.

23. The camera device according to claim 1, characterized in that the carriage can be moved into an auxiliary position beyond the standby position, and, in particular, the auxiliary position can only be reached without the use of the drive unit.

24. The camera device according to claim 1, wherein the cover is operable to close the opening in the housing in the closed position of the cover when the camera assumes its auxiliary position.

* * * * *